United States Patent
Hsin et al.

(10) Patent No.: US 8,045,436 B2
(45) Date of Patent: Oct. 25, 2011

(54) METHOD AND APPARATUS FOR ADJUSTING FOCUS OFFSET BASED ON TARGET CONDITION

(75) Inventors: Kuo-Ting Hsin, Hsin-Chu Hsien (TW); Chao-Ming Huang, Hsin-Chu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 618 days.

(21) Appl. No.: 11/947,765

(22) Filed: Nov. 29, 2007

(65) Prior Publication Data

US 2009/0141598 A1 Jun. 4, 2009

(51) Int. Cl.
*G11B 11/00* (2006.01)

(52) U.S. Cl. .................................................. 369/53.28

(58) Field of Classification Search ............... 369/53.28, 369/47.5, 47.51, 47.52, 47.53, 116, 44.25–44.35
See application file for complete search history.

(56) References Cited

U.S. PATENT DOCUMENTS

| | | | | |
|---|---|---|---|---|
| 5,077,719 A * | 12/1991 | Yanagi et al. | ............... | 369/44.13 |
| 5,218,588 A * | 6/1993 | Suzuki | ............... | 369/44.27 |
| 5,282,184 A * | 1/1994 | Takikita | ............... | 369/44.25 |
| 5,351,224 A * | 9/1994 | Nagata et al. | ............... | 369/44.29 |
| 5,970,032 A * | 10/1999 | Ikeda et al. | ............... | 369/44.29 |
| 6,192,010 B1 | 2/2001 | Wang et al. | | |
| 6,240,055 B1 * | 5/2001 | Takamine et al. | ............... | 369/44.29 |
| 6,522,605 B1 * | 2/2003 | Tada et al. | ............... | 369/44.26 |
| 6,545,964 B1 | 4/2003 | Takase | | |
| 7,715,286 B2 * | 5/2010 | Miyake et al. | ............... | 369/44.23 |
| 7,724,619 B2 | 5/2010 | Chen et al. | | |
| 2004/0145978 A1 * | 7/2004 | Yamamoto | ............... | 369/44.32 |
| 2008/0008077 A1 * | 1/2008 | Hirai | ............... | 369/112.01 |
| 2008/0094972 A1 * | 4/2008 | Van Endert | ............... | 369/47.53 |
| 2009/0290457 A1 * | 11/2009 | Janssen et al. | ............... | 369/44.32 |

FOREIGN PATENT DOCUMENTS

JP 2002288851 A 10/2002
TW 200731244 8/2007

* cited by examiner

*Primary Examiner* — Tan X Dinh
(74) *Attorney, Agent, or Firm* — Winston Hsu; Scott Margo

(57) ABSTRACT

The present invention provides an apparatus of an optical disc drive for adjusting a focus error signal. The apparatus includes a focus offset determining unit and an adjusting module. The focus offset determining unit is utilized for determining a target focus offset corresponding to a target condition, and the adjusting module is coupled to the focus offset determining unit and utilized for receiving the focus error signal and adjusting the focus error signal with the target focus offset to generate an adjusted focus error signal.

8 Claims, 5 Drawing Sheets

METHOD AND APPARATUS FOR ADJUSTING FOCUS OFFSET BASED ON TARGET CONDITION

BACKGROUND

The present invention relates to an apparatus applied to an optical disc drive with adjustable focus offset and a method thereof.

When an optical disc is accessed by a pickup head in an optical disc drive, the conventional servo system of the optical disc drive will control the pickup head to emit a controlled laser emission to a proper location on the optical disc. The optimum focus point of the laser power (emission) upon the optical disc varies with the type of pickup head, optical disc, etc. This is because different type of pickup heads will have different structure of optical paths, and different types of optical discs will have different thicknesses. In other words, the minimum focus error (FE) signal will not guarantee that the current focus point is the optimum focus point upon a specific optical disc. Therefore, in the conventional focus control loop, a focus offset is added to the focus error signal to generate an adjusted focus error signal, which then the adjusted focus error signal is transferred to a controller. The controller tunes the position of the pickup head to optimize the focus of the laser spot upon a data recording layer of the optical disc. Accordingly, an optimized focus offset will be obtained to achieve an optimum reflected signal quality.

Furthermore, it is well-known that higher rotational speeds of the optical disc result in decreased SNR performance, degrading the decoding accuracy of the physical address and data of the optical disc. Thus, to increase the reading quality of the optical disc, strength of the laser power is dependent on the tangential velocity of the position of the optical disc to be accessed. In other words, the focus offset should be adjusted when the laser power changes. If the same focus error is adopted and added to the focus error signal in a case where the laser power changes in response to the tangent velocity change, the actual focus of the laser spot is shifted from the optimum focus. Therefore, a novel scheme of dynamically calibrating the focus error is required to optimize the focus of the laser spot for every position of the optical disc to be accessed.

SUMMARY

It is therefore one of the objectives of the claimed invention to provide an optical disc drive for adjusting focus offset, and method thereof.

According to an embodiment of the present invention, an apparatus of an optical disc drive for adjusting a focus error signal is disclosed. The apparatus comprises a focus offset determining unit and an adjusting module. The focus offset determining unit is utilized for determining a target focus offset corresponding to a target condition, and the adjusting module is coupled to the focus offset determining unit and used for receiving the focus error signal and adjusting the focus error signal with the target focus offset to generate an adjusted focus error signal.

According to the embodiment of the present invention, a method for an optical disc drive to adjust a focus error signal is disclosed. The method comprises determining a target focus offset corresponding to a target condition, and receiving the focus error signal and adjusting the focus error signal with the target focus offset to generate an adjusted focus error signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
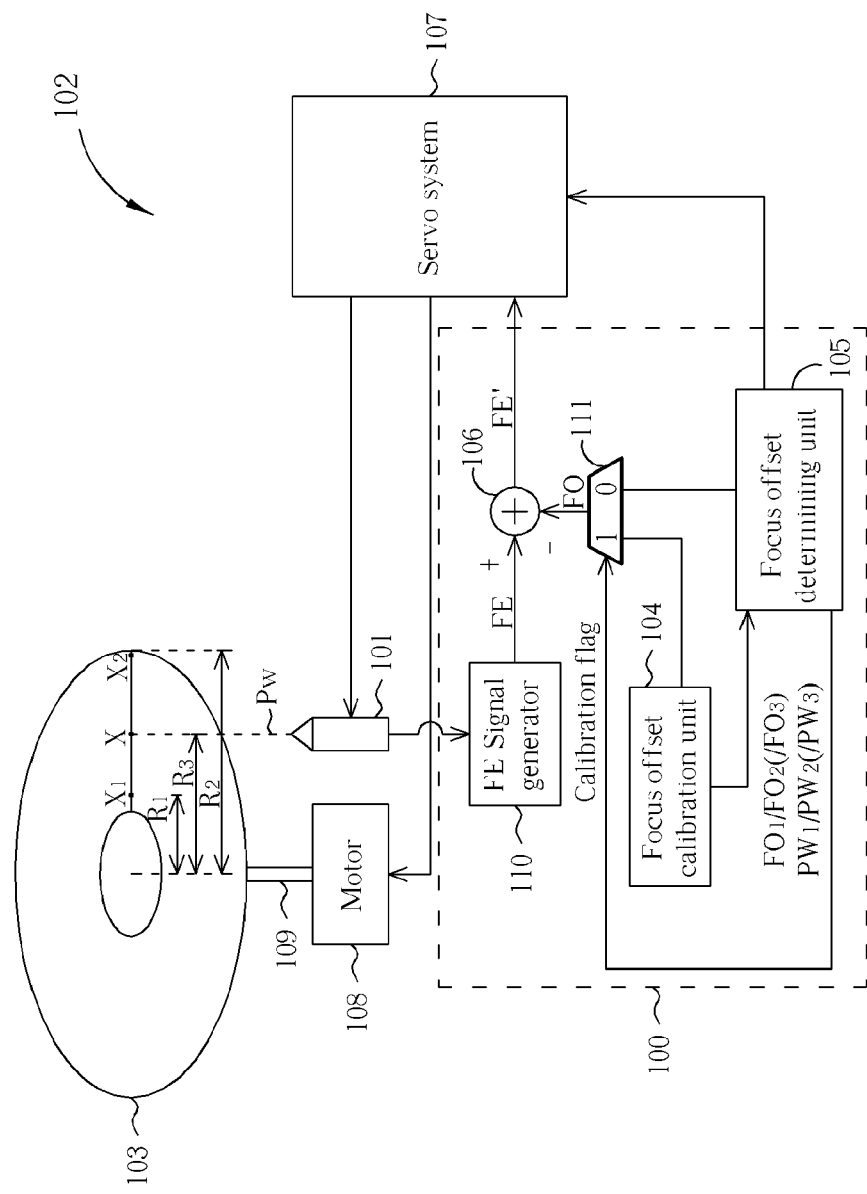
FIG. 1 is a diagram illustrating an embodiment of an apparatus for adjusting a focus error signal when a pickup head utilizes a target laser power to access an optical disc according to the present invention.

Please refer to FIG. 1. FIG. 1 illustrates a diagram for an embodiment of apparatus 100 of an optical disc drive 102, for adjusting a focus error signal FE when a pickup head 101 utilizes a target laser power PW to access an optical disc 103 according to the present invention. In addition to the apparatus 100, the optical disc drive 102 further includes a motor 108, a spindle 109, the pickup head 101, a servo system 107, and a focus error (FE) signal generator 110. The apparatus 100 comprises a focus offset calibration unit 104, a focus offset determining unit 105, an adjusting module 106, an FE signal generator 110, and a multiplexer 111. The FE signal generator 110 is able to output the focus error signal FE according to reflected light detected by the pickup head 101. Since the generation of the focus error signal FE is well known, further description is omitted here for brevity. The focus offset calibration unit 104 is utilized to perform a first focus offset calibration to obtain a first focus offset $FO_1$ when the pickup head 101 utilizes a first laser power $PW_1$ to access the optical disc 103, and to perform a second focus offset calibration to obtain a second focus offset $FO_2$ when the pickup head 101 utilizes a second laser power $PW_2$ to access the optical disc 103. It should be noted that the first laser power $PW_1$ is different from the second laser power $PW_2$ in this embodiment. The focus offset determining unit 105 is coupled to the focus offset calibration unit 104, and is able to determine a target focus offset corresponding to a target condition, where the target condition can be a target laser power, a target position on the optical disc 103, or a target tangential velocity associated with a position on the optical disc 103, etc. For instance, the focus offset determining unit 105 can calculate a target focus offset FO corresponding to the target laser power PW according to at least the first focus offset $FO_1$, the second focus offset $FO_2$, the first laser power $PW_1$, the second laser power $PW_2$, and the target laser power PW. There are many ways for the focus offset determining unit 105 to calculate the target focus offset FO corresponding to the target laser power PW. For example, the focus offset determining unit 105 can derive the target focus offset FO by performing an interpolation or extrapolation according to at least the first focus offset $FO_1$ and second focus offset $FO_2$ or by obtaining multiple focus offsets to determine an equation based on these focus offsets according to curve fitting. The target focus offset FO can also be obtained from a lookup table. The first focus offset $FO_1$ and the second focus offset $FO_2$ are obtained by the focus offset determining unit 105 before the target focus offset is determined; the first focus offset $FO_1$ and the second focus offset $FO_2$ can be obtained offline or online. The adjusting module 106 is able to receive the focus error signal FE and to adjust the focus error signal FE with the target focus target offset to generate an adjusted focus error signal FE'.

Furthermore, the servo system 107 is coupled to the focus offset determining unit 105, the adjusting module 106, the pickup head 101, and the motor 108, in which the motor 108 is coupled to a spindle 109 of the optical disc 103 for driving the spindle 109 to rotate in different modes. The multiplexer 111 is controlled by a calibration flag, which is outputted from the focus offset determining unit 105. When the calibration flag is bit '1' and the optical disc drive 102 enters calibration mode, the focus offset calibration unit 104 generates the first and second focus offsets by respectively adjusting different focus offsets outputted to the adjusting module 105 via the multiplexer 111. That is, the focus offset calibration unit 104 controls the procedure of obtaining the first focus offset FO1 and the second focus offset FO2 via the multiplexer 111, which are to be transmitted to the focus offset determining unit 105. In other words, the focus offset calibration unit 104 calculates respective focus offsets corresponding to different conditions, e.g. different laser powers, different positions on the optical disc 103, or tangential velocities of the different positions on the optical disc 103. After the respective focus offsets are calculated, the focus offset calibration unit 104 records these focus offsets, which are to be used by the focus offset determining unit 105 for determining the target focus offset FO corresponding the target condition. When the calibration flag is bit '0' and the optical disc drive 102 enters normal mode, the focus offset determining unit 105 will determine the target focus offset FO corresponding to the target condition according to the recorded focus offsets and their corresponding conditions; for example, the focus offset determining unit 105 calculates the target focus offset FO according to the target laser power PW, first laser power $PW_1$, second laser power $PW_2$, first focus offset $FO_1$, and the second focus offset $FO_2$.

Figure 2:
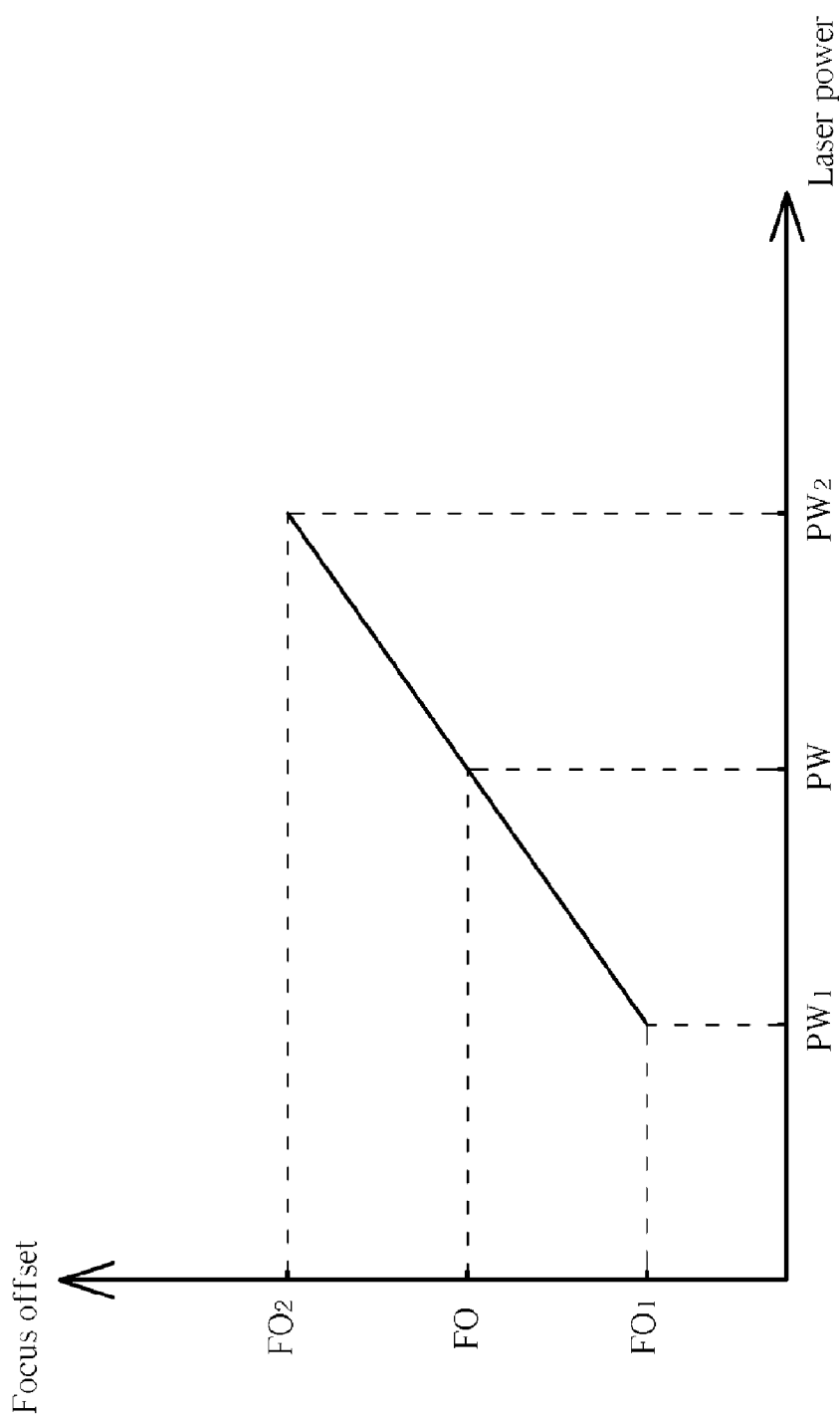
FIG. 2 is a diagram illustrating the interpolation between the first focus offset and the second focus offset by referencing the first laser power and the second laser power of the present invention.

On the other hand, the laser power of the pickup head 101 is proportional to the linear (tangential) velocity of the accessed position on the optical disc 103. Therefore, when the apparatus 100 operates in the CAV (Constant angular velocity) mode (or partial constant angular velocity mode, PCAV), which the servo system 107 controls the motor 108 to drive the velocity at the position of the inner radius of the optical disc 103, it is the slowest. The linear (tangential) velocity at the position of the outer radius of the optical disc 103 is the fastest, and thus the laser power of the pickup head 101 at the inner radius of the optical disc 103 is the lowest and the laser power at the outer radius of the optical disc 103 is the highest. In order to optimize the target laser power PW to focus on the optical disc 103, for example, the focus offset determining unit 105 will first perform an interpolation to obtain the target focus offset FO by referencing the first focus offset $FO_1$, the second focus offset $FO_2$, the first laser power $PW_1$, the second laser power $PW_2$, and the target laser power PW. Meanwhile, the optical disc 103 is loaded into the optical disc drive 102. Please refer to FIG. 2. FIG. 2 is a diagram illustrating the interpolation between the first focus offset $FO_1$ and the second focus offset $FO_2$ by referencing the first laser power $PW_1$ and the second laser power $PW_2$ according to an embodiment of the present invention.

In the CAV mode, to obtain the first focus offset $FO_1$, the second focus offset $FO_2$, the first laser power $PW_1$, the second laser power $PW_2$, the pickup head 101 first utilizes the first laser power $PW_1$ to access a first position $X_1$ (e.g. on the inner radius of the optical disc 103 in FIG. 1) on the optical disc 103, where the first position $X_1$ corresponds to a first tangent velocity $V_1$. The focus offset calibration unit 104 will determine the first focus offset $FO_1$ and then adjust the focus error signal FE by the first focus offset $FO_1$. The adjusted focus error signal FE'=FE-$FO_1$ is transferred to the servo system 107, in which the servo system 107 controls the first laser power $PW_1$ of the pickup head 101 according to the adjusted focus error signal FE'. Accordingly, the pickup head 101 can emit the first laser power $PW_1$ to the optimal focus point on a desired recording layer of the optical disc 103 for reading/writing data thereof. Then, when the pickup head 101 utilizes the second laser power $PW_2$ to access a second position $X_2$ (e.g. on the outer radius of the optical disc 103 in FIG. 1) on the optical disc 103, where the second position $X_2$ corresponds to a second tangent velocity $V_2$, the focus offset calibration unit 104 will determine the second focus offset $FO_2$ and then adjust the focus error signal FE by the second focus offset $FO_2$. The adjusted focus error signal FE'=FE-$FO_2$ is transferred to the servo system 107, in which the servo system 107 controls the second laser power $PW_2$ of the pickup head 101 according to the adjusted focus error signal FE'. Accordingly, the pickup head 101 can emit the second laser power $PW_2$ to the optimal focus point on a desired recording layer of the optical disc 103 for reading/writing data thereof. Please note that the above operation is dominated by a well-known focus control loop, and hence a detailed description is omitted here. Additionally, in this embodiment, the selection of the test positions $X_1$ and $X_2$ is only for illustrative purposes. The present invention is not limited to use the test laser power to access these two test positions $X_1$ and $X_2$.

Please refer to FIG. 2 and FIG. 1, the x-axis represents the laser power and the y-axis represents the focus offset, which can be viewed as the focus offset between $FO_1$ and $FO_2$ this is obtained through interpolation with respect to the laser power between $PW_1$ and $PW_2$. Furthermore, the focus offset determining unit 105 utilizes equation (1) to perform the interpolation to determine the target focus offset FO corresponding to the target laser power PW.

$$FO=FO_1+((FO_2-FO_1)/(PW_2-PW_1))(PW-PW_1) \qquad (1)$$

Accordingly, whenever the pickup head 101 accesses any position between the first position $X_1$ and the second position $X_2$, by using a laser power between the first laser power $PW_1$ and the second laser power $PW_2$, the focus offset determining unit 105 will provide the corresponding focus offset to the multiplexer 111 according to equation (1). That is, the focus offset determining unit 105 can determine one target focus offset corresponding to any target condition, e.g. a target position on the optical disc 103. Additionally, since there exists a mapping relationship between positions on the optical disc 103 and the tangential velocities of the positions, the focus offset determining unit 105 can also determine a target focus offset FO corresponding to a target tangential velocity of any position on the optical disc 103. The multiplexer 111 then directly outputs the target focus offset calculated by the focus offset determining unit 105 to the adjusting module 106. It should be noted that the required parameters $FO_1$ and $FO_2$, which are referenced by the focus offset determining unit 105, are determined by the focus offset calibration unit

104. In the CAV mode, because the laser power of the pickup head 101 is proportional to the position radius R of the optical disc 103, the focus offset determining unit 105 can utilize the position radius R to proceed with interpolation, in other words, equation (1) can be changed as below:

$$FO=FO_1+((FO_2-FO_1)/(R_2-R_1))(R-R_1) \quad (2)$$

Accordingly, whenever the pickup head 101 accesses any position having a position radius between the first position radius $R_1$ shown in FIG. 1 and the second position radius $R_2$ shown in FIG. 1, the focus offset determining unit 105 will provide the corresponding focus offset to the multiplexer 111, using a laser power between the first laser power $PW_1$ and the second laser power $PW_2$, and according to equation (2). Therefore, the present invention is capable of adding different target focus error values to the focus error signal FE of each position between the first position $X_1$ and the second position $X_2$ on the optical disc 103.

As mentioned above, the laser power for accessing a specific disc position changes as the tangent velocity of the specific disc position changes. In addition, it is well known that in a CAV mode, the tangent velocity is proportional to the position radius. Briefly summarized, according to the present invention, the pickup head 101 utilizes the first laser power $PW_1$ to access a first position $X_1$ on the optical disc 103, where the first position $X_1$ corresponds to a first tangent velocity $V_1$ The pickup head 101 utilizes the second laser power $PW_2$ to access a second position $X_2$ on the optical disc 103, where the second position $X_2$ corresponds to a second tangent velocity $V_1$. The pickup head 101 also utilizes the target laser power PW to access a target position X on the optical disc 103 where the target position X corresponds to a target tangent velocity V, and the focus offset determining unit 105 performs the interpolation to obtain the target focus offset FO by referencing the first focus offset $FO_1$, the second focus offset $FO_2$, the first tangent velocity $V_1$, the second tangent velocity $V_2$, and the target tangent velocity V.

Figure 3:
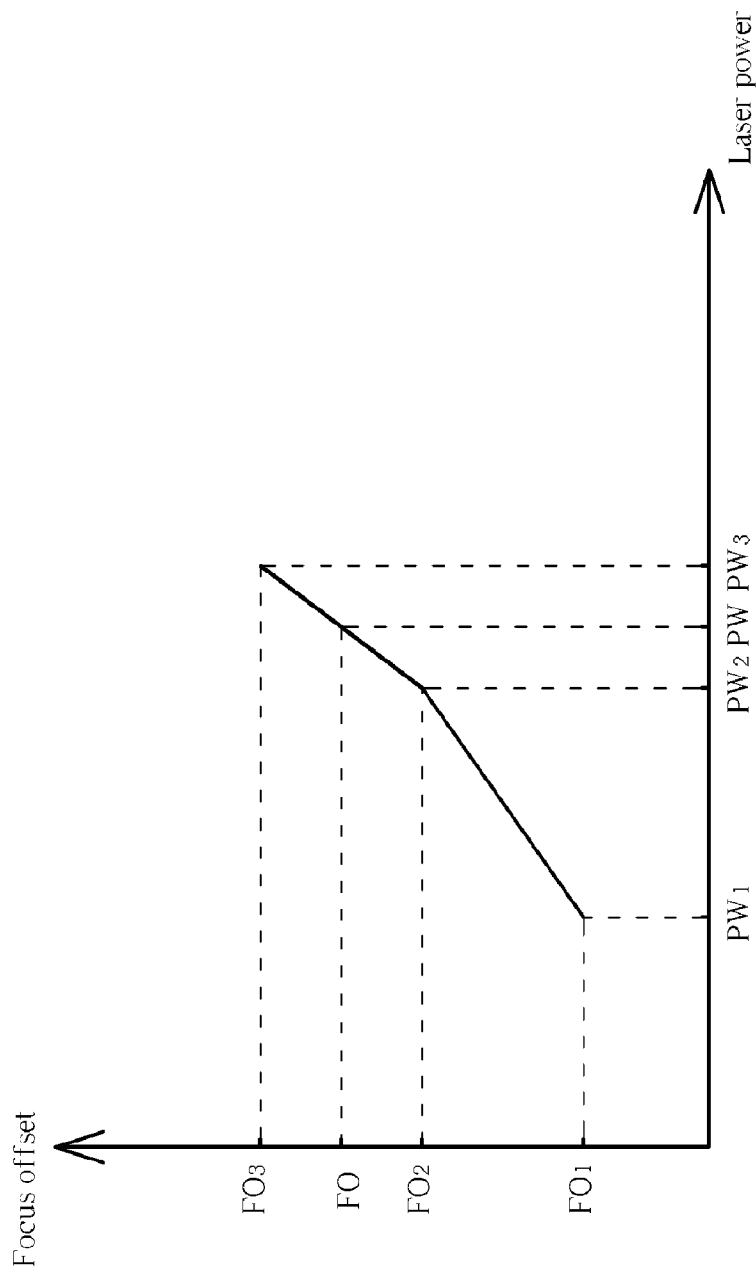
FIG. 3 is a diagram illustrating the interpolation between the first focus offset, the second focus offset, and the third focus offset by referencing the first laser power, the second laser power, and the third laser power of the present invention.

Please note that, in order to prevent nonlinearity of the optical disc 103, the present invention can also perform the focus error signal FE calibration according to radius intervals of the optical disc 103. Therefore, in another embodiment of the present invention, the focus offset calibration unit 104 further performs a third focus offset calibration to obtain a third focus offset $FO_3$ when the pickup head 101 utilizes a third laser power $PW_3$ to access the optical disc 103. The second laser power $PW_2$ is between the first laser power $PW_1$ and the third laser power $PW_3$. Please refer to FIG. 3, FIG. 3 is a diagram illustrating the interpolation between the first focus offset $FO_1$, the second focus offset $FO_2$, and the third focus offset $FO_3$ by referencing the first laser power $PW_1$, the second laser power $PW_2$, and the third laser power $PW_3$ of the present invention. When the target laser power PW falls between the first laser power $PW_1$ and the second laser power $PW_2$, the focus offset determining unit 105 calculates the target focus offset FO corresponding to the target laser power PW according to the first focus offset $FO_1$ and the second focus offset $FO_2$ (equation (1) or equation (2)). When the target laser power PW falls between the second laser power $PW_2$ and the third laser power $PW_3$, the focus offset determining unit 105 calculates the target focus offset FO corresponding to the target laser power PW, the second focus offset $FO_2$, and the third focus offset $FO_3$; related description is illustrated in equation (3):

$$FO=FO_2+((FO_3-FO_2)/(PW_3-PW_2))(PW-PW_2) \quad (3)$$

or equation (4):

$$FO=FO_2+((FO_3-FO_2)/(R_3-R_2))(R-R_2) \quad (4)$$

Furthermore, please note that, the accessing operation of the pickup head 101 in the above mentioned embodiments includes: writing data to the optical disc 103, or reading data from the optical disc 103. That is, the disclosed focus error calibration can be applied when data writing or data reading is enabled. Additionally, using two radius intervals is only meant for illustrative purposes. Other embodiments involving segmenting the optical disc 103 into more than two radius intervals are possible.

Figure 4:
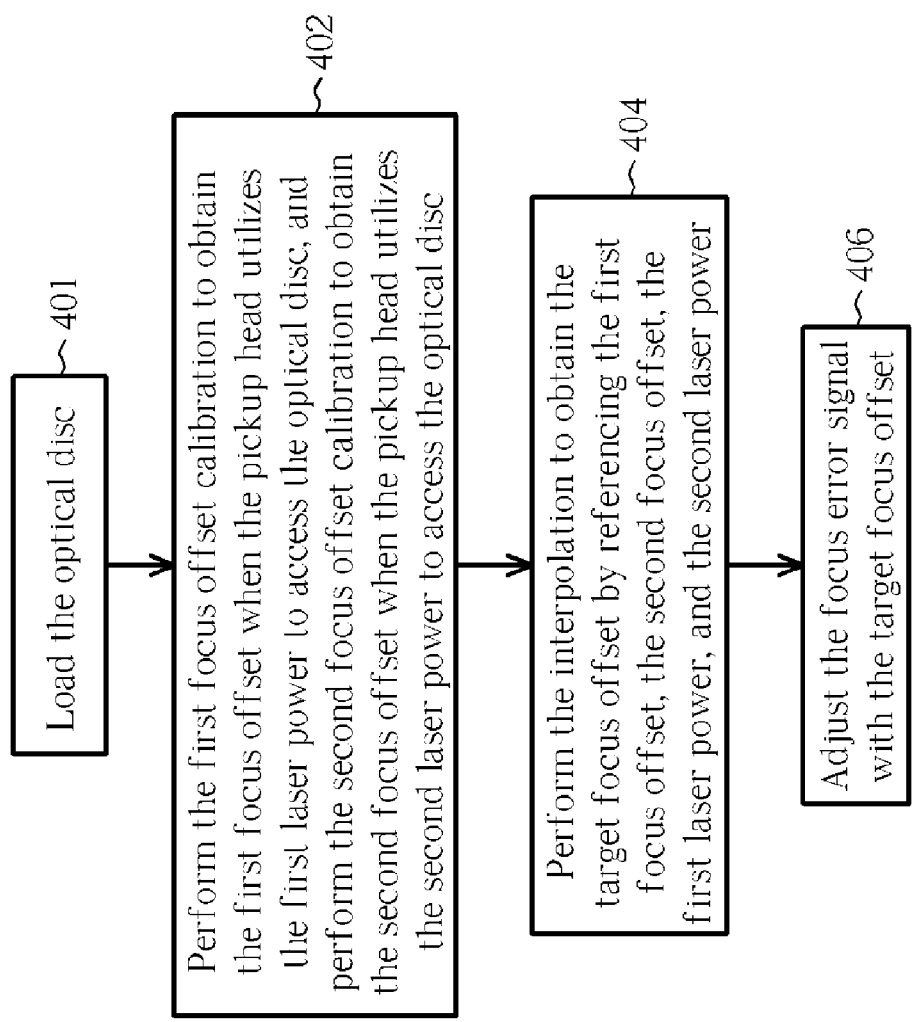
FIG. 4 is a first flowchart illustrating the adjustment of the focus error signal when the pickup head utilizes the target laser power to access the optical disc of FIG. 1.

Please refer to FIG. 4. FIG. 4 illustrates a first flowchart for adjusting the focus error signal FE when the pickup head 101 utilizes the target laser power PW to access the optical disc 103 of FIG. 1. The method includes the steps as listed below:

Step 401: Load the optical disc 103.

Step 402: Perform the first focus offset calibration to obtain the first focus offset $FO_1$ when the pickup head 101 utilizes the first laser power $PW_1$ to access the optical disc 103, and perform the second focus offset calibration to obtain the second focus offset $FO_2$ when the pickup head 101 utilizes the second laser power $PW_2$ to access the optical disc 103.

Step 404: Perform interpolation to obtain the target focus offset FO by referencing the first focus offset $FO_1$, the second focus offset $FO_2$, the first laser power $PW_1$, and the second laser power $PW_2$.

Step 406: Adjust the focus error signal FE with the target focus offset FO.

Please note that, in step 404, because the laser power of the pickup head 101 is proportional to the tangent velocity of the accessed position on the optical disc 103. Therefore, when the optical disc 103 operates in the CAV (Constant angular velocity) mode, the first laser power $PW_1$ and the second laser power $PW_2$ can be replaced with the corresponding first position $X_1$ and second position $X_2$, respectively. These are represented by equation (1) and the equation (2), respectively.

Figure 5:
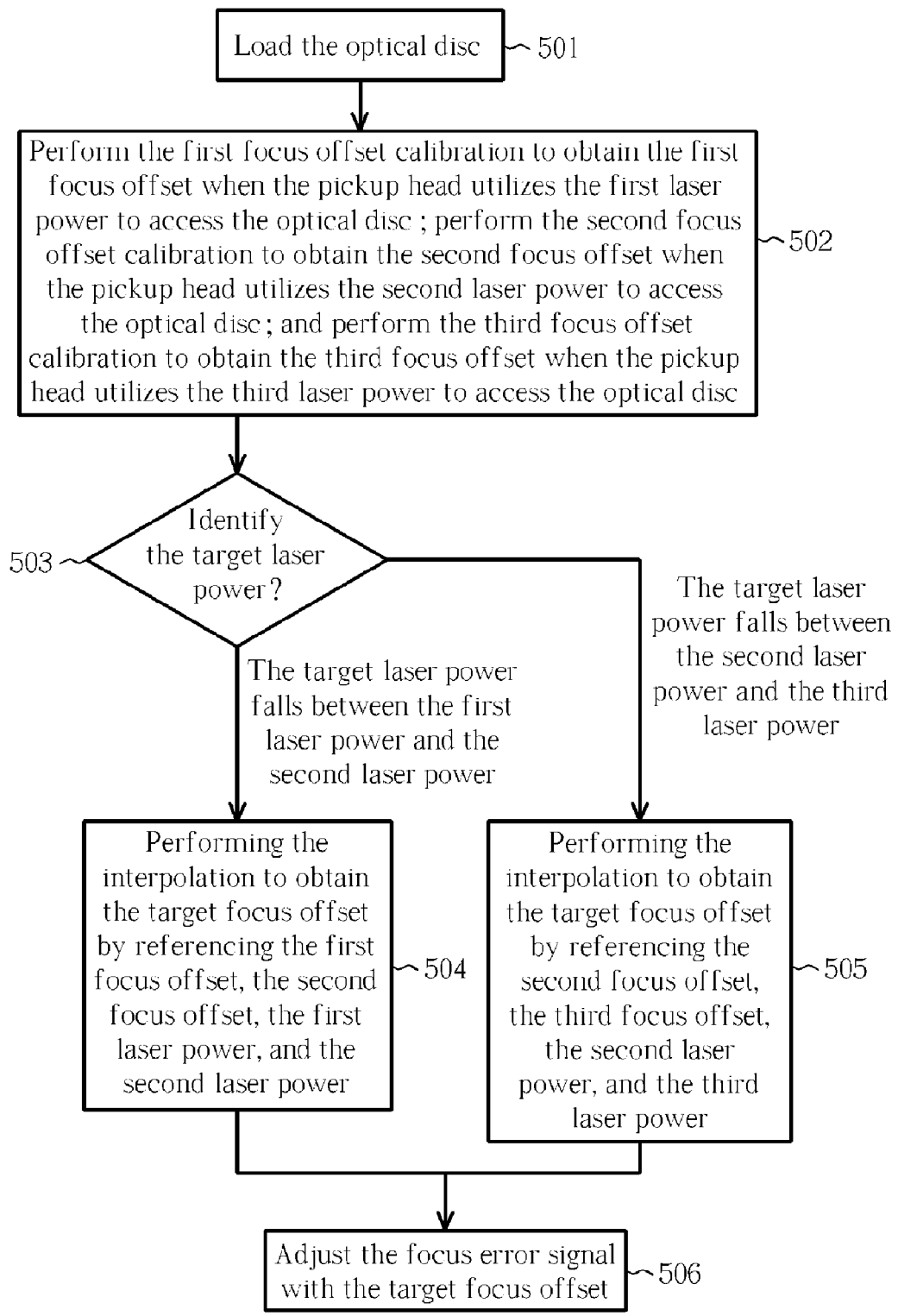
FIG. 5 illustrates a second flowchart for adjusting the focus error signal when the pickup head utilizes the target laser power to access the optical disc of FIG. 1.

Please refer to FIG. 5. FIG. 5 illustrates a second flowchart for adjusting the focus error signal FE with the target focus offset FO when the pickup head 101 utilizes the target laser power PW to access the optical disc 103 of FIG. 1. The method includes the steps as below:

Step 501: Load the optical disc 103.

Step 502: Perform the first focus offset calibration to obtain the first focus offset $FO_1$ when the pickup head 101 utilizes the first laser power $PW_1$ to access the optical disc 103, perform the second focus offset calibration to obtain the second focus offset $FO_2$ when the pickup head 101 utilizes the second laser power $PW_2$ to access the optical disc 103, and perform the third focus offset calibration to obtain the third focus offset $FO_3$ when the pickup head 101 utilizes the third laser power $PW_3$ to access the optical disc 103.

Step 503: Identify the target laser power PW. If the target laser power PW falls between the first laser power $PW_1$ and the second laser power $PW_2$, go to step 504; and if the target laser power PW falls between the second laser power $PW_2$ and the third laser power $PW_3$, go to step 505.

Step 504: Perform interpolation to obtain the target focus offset FO by referencing the first focus offset $FO_1$, the second focus offset $FO_2$, the first laser power $PW_1$, and the second laser power $PW_2$. Then go to step 506.

Step 505: Perform interpolation to obtain the target focus offset FO by referencing the second focus offset $FO_2$, the third focus offset $FO_3$, the second laser power $PW_2$, and the third laser power $PW_3$.

Step 506: Adjust the focus error signal FE with the target focus offset FO.

Please note that in step 504, because the laser power of the pickup head 101 is proportional to the tangent velocity of the accessed position on the optical disc 103. Therefore, when the optical disc 103 operates in CAV (Constant angular velocity) mode, the first laser power $PW_1$ and the second laser power $PW_2$ can be replaced with the corresponding first position $X_1$ and second position $X_2$ respectively. These are also represented by equation (1) and the equation (2). Similarly, in step 505, the second laser power $PW_2$ and the third laser power $PW_3$ can be replaced with the corresponding second position $X_2$ and third position $X_3$, which are also represented by equation (3) and the equation (4), respectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus of an optical disc drive for adjusting a focus error signal, comprising:
   a focus offset determining unit for determining a target focus offset corresponding to a target laser power, wherein the focus offset determining unit obtains at least a first focus offset corresponding to a first laser power and a second focus offset corresponding to a second laser power before determining the target focus offset;
   an adjusting module, coupled to the focus offset determining unit, for receiving the focus error signal and adjusting the focus error signal with the target focus offset to generate an adjusted focus error signal;
   a multiplexer, coupled to the focus offset determining unit and the adjusting module; and
   a focus offset calibration unit, coupled to the multiplexer and the focus offset determining unit, for generating a first and a second focus offsets according to a first and a second laser powers respectively;
   wherein under calibration mode the focus offset calibration unit generates the first and second focus offsets by respectively adjusting different focus offsets outputted to the adjusting module via the multiplexer; and under normal mode the focus offset determining unit determines the target focus offset according to the first and second focus offsets generated by the focus offset calibration unit.

2. The apparatus of claim 1, wherein the focus offset determining unit performs an interpolation/extrapolation to obtain the target focus offset according to the first focus offset, the second focus offset, the first laser power, the second laser power, and the target laser power.

3. The apparatus of claim 1, wherein the focus offset determining unit obtains the target focus offset from a lookup table according to the first focus offset, the second focus offset, the first laser power, the second laser power, and the target laser power.

4. The apparatus of claim 1, wherein the focus offset determining unit obtains the target focus offset corresponding to the target laser power by an equation based on the first focus offset, the second focus offset, the first laser power, and the second laser power according to a curve fitting.

5. A method for an optical disc drive to adjust a focus error signal, comprising:
   determining a target focus offset corresponding to a target laser power; and
   receiving the focus error signal and adjusting the focus error signal with the target focus offset to generate an adjusted focus error signal;
   generating a first and a second focus offsets according to a first and a second laser powers respectively;
   wherein under calibration mode the first and second focus offsets are generated by respectively adjusting different focus offsets; and under normal mode the target focus offset is determined according to the generated first and second focus offsets.

6. The method of claim 5, wherein performing an interpolation/extrapolation to obtain the target focus offset according to the first focus offset, the second focus offset, the first laser power, the second laser power, and the target laser power.

7. The method of claim 5, wherein obtaining the target focus offset from a lookup table according to the first focus offset, the second focus offset, the first laser power, the second laser power, and the target laser power.

8. The method of claim 5, wherein obtains the target focus offset corresponding to the target laser power by an equation based on the first focus offset, the second focus offset, the first laser power, and the second laser power according to a curve fitting.

* * * * *